F. S. BLIVEN.
WEATHER SHIELD FOR MOTOR CARS.
APPLICATION FILED OCT. 30, 1915.
1,212,891. Patented Jan. 16, 1917.
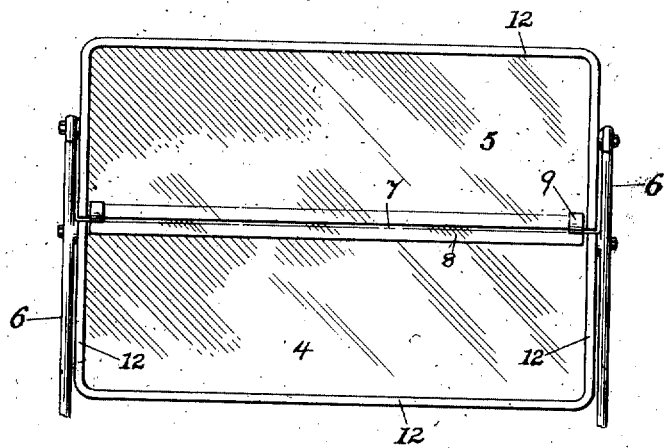
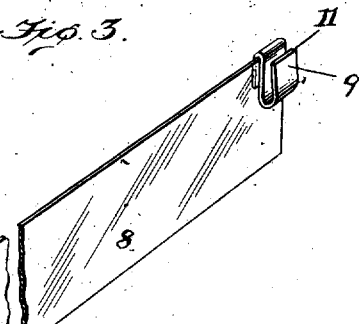
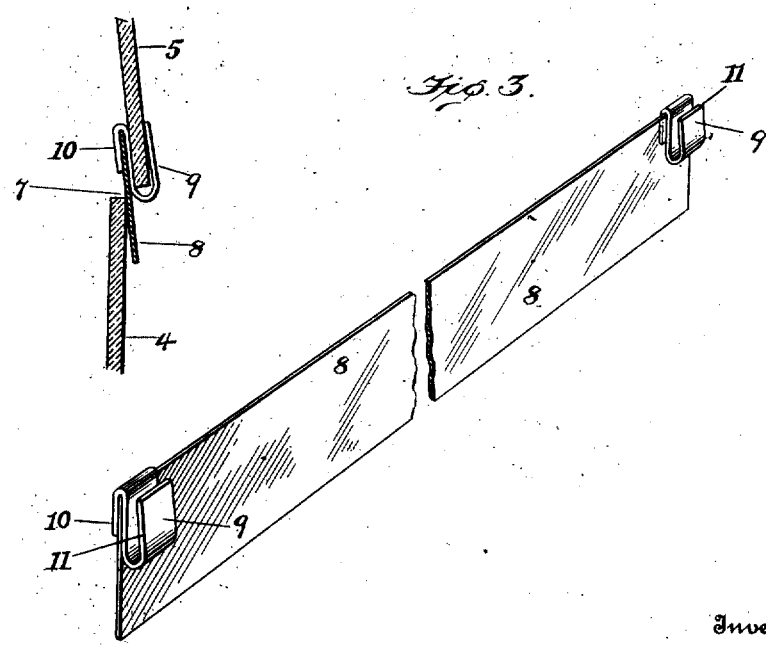
Witnesses
Edwin L. Bradford
Bertha K. Walter
Inventor
Frank S. Bliven
By Mann & Co.
Attorney

UNITED STATES PATENT OFFICE.

FRANK S. BLIVEN, OF BALTIMORE, MARYLAND.

WEATHER-SHIELD FOR MOTOR-CARS.

1,212,891. Specification of Letters Patent. Patented Jan. 16, 1917.

Application filed October 30, 1915. Serial No. 58,751.

*To all whom it may concern:*

Be it known that I, FRANK S. BLIVEN, a citizen of the United States, residing at Baltimore, in the State of Maryland, have invented certain new and useful Improvements in Weather-Shields for Motor-Cars, of which the following is a specification.

This invention relates to an improved clear-vision weather shield for motor cars.

This improvement has reference to two glass plates one above the other and mounted in supports and serving to protect the occupants of a moving car from wind and rain. Shields of this type are common and have the desirable feature of affording a clear vision to the driver and other occupants of the car, but on the other hand they have an objectionable feature in the open aperture or crack along the horizontal line where the two glass plates are separated. The crack or aperture is objectionable because in a rain storm, the rain that falls on the upper glass runs down and fills the crack, and the wind, or the car moving forward through the air, has the effect to force the rain from the crack and throw water onto the occupants of the car.

The object of this invention is to provide a transparent strip of flexible material long enough to extend along the whole length of the open crevice between the adjoining edges of the two glass plates of a windshield, and apply such strip to the back surface of the upper plate overlapping its lowermost edge and with a portion of the said strip extending downwardly and overlapping freely the uppermost edge of the lower plate at its front surface, and also to provide means to attach said strip to the upper plate only.

The invention is illustrated in the accompanying drawing in which,—

Figure 1, is a front elevation of a glass plate weather shield with my improvement attached. Fig. 2, is a vertical cross-section of the two glass-plate shield and showing the improved transparent strip applied. Fig. 3, is a perspective view of the transparent strip alone, broken at the center merely for the purpose of shortening its length proportion, and showing at each end one of the attaching clips.

Referring to the drawing the numeral 4, designates the lower glass-plate, and 5, the upper glass-plate of an ordinary weather shield; these two plates are supported by side standards 6, in any of the well-known methods of construction which permit of plates being variously adjusted. One plate is above the other and when the two plates are in vertical position an aperture or crack 7, is left open along the horizontal line between the two glass plates. It is inexpedient for the horizontal adjoining edges of the two glass plates that form the open aperture 7, to be in contact, for the reason that any rough movement of the car while traveling along a road might, if the glass edges contacted, or were too close together, cause one edge to knock against the other and chip the glass. As already explained the crack 7, allows the rain to beat into the car.

It is of first importance that the clearvision of the two plate glass weather-shield shall be preserved, and this object is fully kept in view in applying the transparent strip 8, to practically cover said crack or aperture. This strip may be made of sheet celluloid that is clear and transparent, or any other suitable transparent material may be used.

As one form of means for attaching the strip 8, to the upper glass-plate 5, I provide suitable metal clips that will engage the upper glass plate 5, and also engage the strip 8.

One form of clip is illustrated in the drawing and designated by the numeral 9. This is an S-shaped clip; one of the hooks 10, of this clip tightly grips one end of the transparent strip, leaving the other hook 11, of the same clip to grip onto the upper glass-plate 5.

As many clips may be used to attach the strip as seem necessary; in the present instance, and for the mere purpose of illustration, two clips are shown one being at each end.

The strip is so applied to the glass plates as to cover the crack or aperture 7, and to prevent the possibility of rain water that may beat against the upper glass 5, from finding its way to or through the said crack. The particular position of the transparent strip in its relation to the glass plates is plainly shown in Fig. 2 of the drawing; it will be seen the lower portion of the strip 8, extends downwardly and overlaps freely the uppermost edge of the lower plate 4, at its front surface.

Each glass plate has a metal band 12, that binds three of its edges, but this construction is no part of the present invention.

My invention is not limited to the precise manner in which the transparent strip is shown to be positioned relative to the line of separation along the adjacent edges of the two glass plates.

Having described my invention what I claim is,—

1. In combination in a wind-shield, two glass sections with means for adjusting the sections, the adjacent edges of the glass sections being unframed so that the central portion of the wind-shield is clear and transparent, means for closing the clearance opening between the sections in the form of a transparent strip of flexible material, and means for holding the transparent strip in position in the form of horizontally spaced members extending between adjacent surfaces of the pivoted glass sections.

2. In combination in a wind-shield, two glass sections with means for adjusting the sections to open and close the wind shield, means for closing the clearance opening between the sections in the form of a transparent strip of flexible material, and means for holding the transparent strip in position in the form of horizontally spaced clips to be inserted between the adjacent surfaces of the pivoted glass sections.

In testimony whereof I affix my signature in the presence of two witnesses.

FRANK S. BLIVEN.

Witnesses:
CHAS. B. MANN,
JOHN W. HEWES.